Jan. 5, 1954  H. O. VOGEL  2,665,096
COLLAPSIBLE DOUBLE-FACED PALLET
Filed Nov. 21, 1951
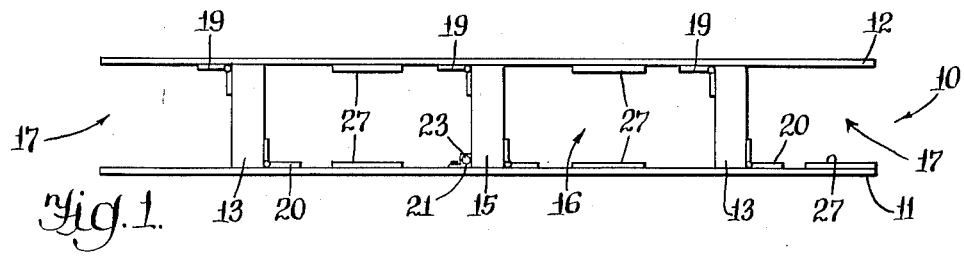
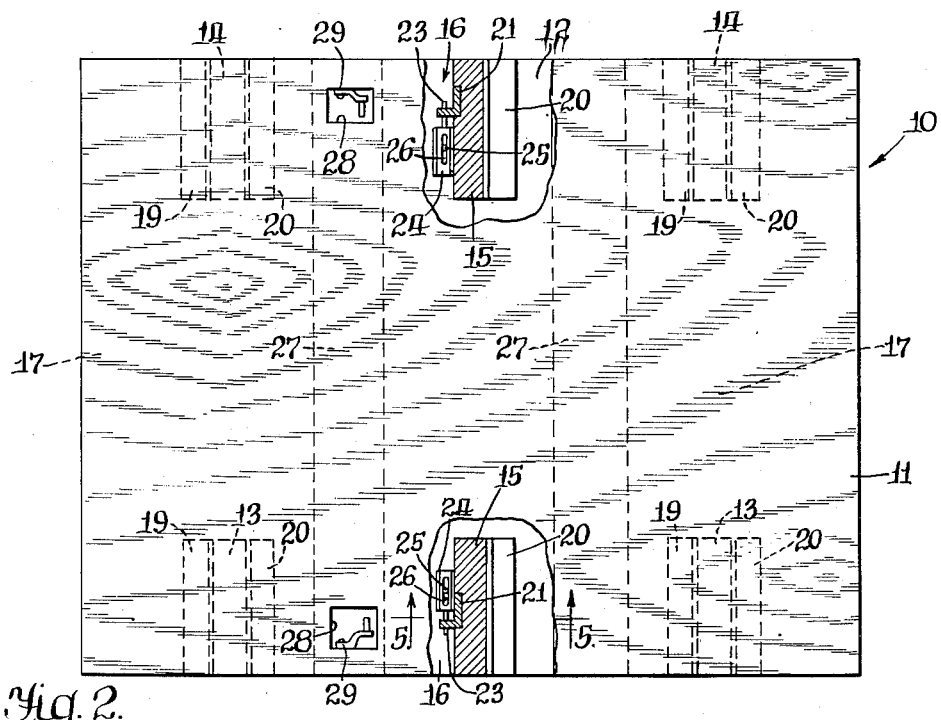
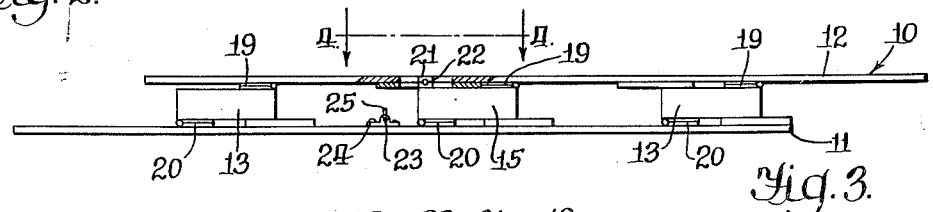
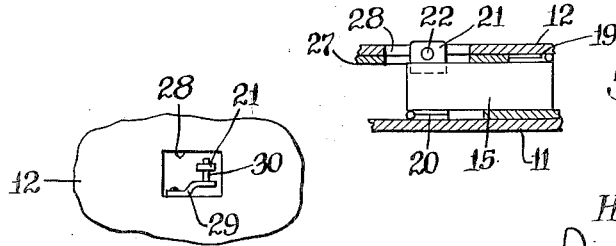
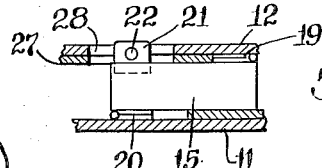
Inventor.
Hilmond O. Vogel Patented Jan. 5, 1954

2,665,096

UNITED STATES PATENT OFFICE 2,665,096

COLLAPSIBLE DOUBLE-FACED PALLET

Hilmond O. Vogel, Chicago, Ill., assignor to International Harvester Company, a corporation of New Jersey Application November 21, 1951, Serial No. 257,476

4 Claims. (Cl. 248—120)

This invention relates to pallet constructions and particularly to a pallet of the double-faced or reversible type. More specifically the invention relates to a double-faced pallet which may be collapsed from its normal operating condition.

In the field of material handling the palletizing of materials for transport purposes has continued to expand greatly. The use of double-faced pallets has been found to be particularly popular since they can readily be transported by the conventional type of fork lift truck and the pallets are so designed that the forks of the lift truck may be inserted from any of the four sides of the pallet for transporting the same. Materials on the pallets are generally loaded with the pallets on box cars or other transporting mediums. After the materials have reached their ultimate point of destination it is usually necessary to return the pallets to their original point of shipment since the pallets are not expendable and are intended to be used over and over again. In returning the empty pallets, the pallets are generally stacked within a freight carrier in superimposed relation. This is generally the case since it is merely coincidental when the pallets are returned to their original point of shipment in a loaded condition.

In the double-faced pallet, the pallet consists of a base section and a superimposed platform which is spaced from the base section by a plurality of supporting members. The base section and the platform are spaced sufficiently far apart to permit the ready entry of the fork of a lift truck. It can readily be seen that in the stacking of these pallets in a freight carrier a considerable amount of space is utilized and much of the space goes to waste in view of the spaced relation of the platform with respect to the base. This lost space is particularly objectionable to the carrier since the carrier's rates are usually dependent on the weight of the materials shipped rather than the space which they occupy. It is a primary object of this invention, therefore, to provide an improved double-faced pallet, said pallet being collapsible from its normal transporting position to a collapsed position for purposes of shipment.

Still another object is to provide a double-faced pallet having a base and a platform positioned on the base in superimposed relation, the pallet including supporting members disposed between the base and the platform, the said supporting members being movable whereupon the base and platform can be relatively moved toward each other to a collapsed position.

Another object is to provide a collapsible double-faced pallet, including a plurality of supporting members which are positioned between a supporting base and a supporting platform, the supporting members being connected to the base and supporting platform by means of hinges whereby the supporting members may be hingedly moved and the platform and base may be moved relatively longitudinally and in a direction toward each other to a collapsed position.

Another object is to provide a collapsible double-faced pallet, the pallet including supporting members which may be moved in a manner permitting the base and the platform to be collapsed, the said pallet including a releasable latch means for normally maintaining the platform and the base in a normal position, the pallet also including a releasable latch means adapted to secure the platform and base in a collapsed position.

These and further objects will become more readily apparent from a reading of the specification when examined in connection with the accompanying sheet of drawings.

In the drawings:

Figure 1 is a side elevational view of a double-faced collapsible pallet.

Figure 2 is a plan view of a double-faced collapsible pallet, certain portions of the view being broken away to show features of the invention.

Figure 3 is a side elevational view of a double-faced pallet showing the pallet in a collapsed position, certain portions of the view being broken away to illustrate certain aspects of the invention.

Figure 4 is a fragmentary view of a portion of a latch mechanism for maintaining the pallet in a collapsed position, the view being taken on the line 4—4 of Figure 3.

Figure 5 is a fragmentary view of a latch mechanism taken along the section line 5—5 of Figure 2.

Referring to the drawing, a pallet of the two-faced or reversible type is generally indicated by the reference character 10. The pallet 10 includes a base 11 upon which a platform 12 is supported in superimposed relation. A plurality of supporting members 13, 14 and 15 are positioned between the base 11 and the platform 12, the supporting members 13, 14 and 15 being laterally spaced with respect to each other to provide open end passages 16 and 17. As best shown in Figure 2 the open end passages 16 and 17 provide entrances through which the forks of a conventional type of fork lift truck may be inserted.

Thus, the forks of a lift truck may be inserted into the passages 16 and 17 from opposite sides of the pallet 10 whereby a four-way entry may be had to said pallet. The supporting members 15 which are positioned on opposite ends of the pallet 10 between the platform 12 and the base 11 are positioned centrally with respect to supporting members 13 and 14. The upper ends of each of the supporting members 13, 14 and 15 are connected to the supporting platform 12 by means of hinges 19. The lower ends of the supporting members 13, 14 and 15 are connected to the base 11 by means of hinges 20.

The normal operating position of the pallet 10 is shown in Figures 1 and 2. In Figure 3 the pallet 10 has been moved to a collapsed position wherein the supporting members 13, 14 and 15 have been hingedly moved to a collapsed position. A latch member 21 is securely connected to each of the supporting members 15, the latch member projecting outwardly with respect to said supporting members. The latch member 21 is provided with an opening 22 which is adapted to be engaged by a slide bolt 23 movable in a conventional type of sliding latch 24. The sliding latch 24 includes a hand-gripping projecting member 25 which projects outwardly of a slot 26 formed in the sliding latch member 24. The sliding latch member 24 is secured to the base 11 and serves to retain the platform 12 and base 11 in the normal operating position as shown in Figures 1 and 2.

The base 11 and platform 12 are provided with a plurality of transversely extending slats, the purpose of which will become presently apparent. As best shown in Figures 2 and 4, the platform 12 is provided with a pair of transversely spaced openings 28. The openings 28 are adapted to receive the latch members 21 when the pallet 10 is moved to a collapsed position as shown in Figure 3. A spring clip 29 is connected to the platform 12 within each of the openings 28, the said spring clip 29 including a projecting member 30 which is adapted to engage the opening 22 of the latch member 21 for securing the base 11 and the platform 12 in the collapsed position.

As shown in Figures 1 and 2, the supporting members 13, 14 and 15 are normally in an upright position with respect to the base 11 and the platform 12. The supporting members 13, 14 and 15 are held in their supporting upright position by means of the slide bolts 23 which engage the openings 22 of the latch members 21, thus, rigidly securing all of the supporting members against hinging movement. Thus, by securely maintaining both of the supports 15 in their upright positions, all of the supporting members are maintained upright and provide proper support for the platform 12 in the normal operating position.

When it is desired to collapse the pallet 10 for shipment the operator merely moves the slide bolts 23 out of engagement with the latch members 21 and the supporting members can quickly be hingedly moved so that the platform 12 moves in a longitudinal direction with respect to the base 11 and toward said base to the collapsed position shown in Figure 3.

In the collapsed position shown in Figure 3, the supporting members 13, 14 and 15 are no longer in the upright position but lie flat and substantially parallel with respect to the base 11 and the platform 12. As indicated the slats 27 suitably serve to maintain and support the supporting members 13, 14 and 15 in the parallel relation with respect to the platform 12 and the base 11.

When the base 11 and platform 12 have been moved to the collapsed position, the latch members 21 are moved into the openings 28 formed in the platform 12. The ends of each of the latch members 21 in this position are flush with the upper surface of the platform 12 so that they will not interfere with any materials which may be carried thereon. The latch members 21 in the position are now engaged by the spring clips 29, the projecting members 30 of the spring clips 29 being placed into engagement with the openings 22 of the latch members 21. By this engagement of the latch members 21 the base 11 and the platform 12 are maintained in the collapsed position. When it is desired to again return the pallet 10 to its normal supporting position each spring clip 29 is merely disengaged from engagement with the latch members 21 and the supporting members 13, 14 and 15 can again be moved to their upright position in supporting relation with respect to the platform 12. At this point the slide bolts 23 of each of the sliding latches 24 can again be moved into operative engagement with latch members 21 to lock the same in position.

It can now be seen that provisions have been made wherein a double-faced pallet can be readily and quickly moved to a collapsed position after it has served its normal supporting and transporting purpose. Thus the space occupied normally by a conventional double-faced pallet has been cut in half and approximately twice as many collapsed pallets can be stored on the freight carrier than has been heretofore possible. Thus the objects of the invention have been fully achieved. It must be understood, however, that changes and modifications may further be made without departing from the spirit of the invention as disclosed nor from the scope thereof as defined in the appended claims.

What is claimed is:

1. A double face pallet for supporting articles to be transported by conventional fork lift trucks comprising a base member, a platform spaced from said base member in superimposed relation, said supporting members having upper and lower oppositely disposed edge portions, the lower edge portions being adapted to seat upon the base members and the upper edge portion being adapted to engage the platform in supporting relation, the supporting members including first and second oppositely disposed sides, a plurality of supporting members positioned between the base member and said platform, said supporting members being laterally spaced with respect to each other to provide openings on the four sides of the pallet whereby the forks of a lift truck may be inserted between the platform and base on each of the four sides of said pallet for transporting the pallet, means for connecting said supporting members to said platform and to said base, said means including first hinge members connected to the first sides of said supporting members and to said base, and second hinge members connected to the second sides of said supporting members and to said platform, said platform and base being relatively movable longitudinally and laterally toward each other during hinging movement of said supporting members whereby said pallet is collapsed.

2. A double face pallet in accordance with claim 1 including releasable latch means connected between the platform and said base for securing said supporting members against hinging movement with respect to said base and platform.

3. A double face pallet in accordance with claim 2 the releasable latch means including a first latch member on said base and a second latch member on one of said supporting members.

4. A double face pallet for supporting articles to be transported by conventional fork lift trucks comprising a base member, a platform spaced from said base member in superimposed relation, a plurality of supporting members positioned between the base member and said platform, said supporting members having upper and lower oppositely disposed edge portions, the lower edge portions being adapted to seat upon the base members and the upper edge portion being adapted to engage the platform in supporting relation, the supporting members including first and second oppositely disposed sides, said supporting members being laterally and longitudinally spaced with respect to each other to provide openings on the four sides of the pallet whereby the forks of a lift truck may be inserted between the platform and base on each of the four sides of said pallet for transporting the pallet, means for connecting said supporting members to said platform and to said base, said means including first hinge members connected to the first sides of said supporting members and to said base, second hinge members connected to said second sides of said supporting members and to said platform, said platform and base being relatively movable longitudinally and laterally toward each other during hinging movement of said supporting members whereby said pallet may be collapsed, a first releasable latch means for securing said supporting members against hinging movement to maintain said pallet in a normal position and a second releasable latch means for securing said platform and base in the collapsed position.

HILMOND O. VOGEL.

References Cited in the file of this patent

UNITED STATES PATENTS

| Number | Name | Date |
|---|---|---|
| 928,726 | Witthaus | July 20, 1909 |
| 1,129,775 | Anthony | Feb. 23, 1915 |
| 2,565,187 | Udell | Aug. 21, 1951 |